United States Patent
Morozov (10) Patent No.: US 12,049,315 B2
(45) Date of Patent: Jul. 30, 2024

(54) GAS PROPULSION THRUST DEVICE

(71) Applicant: Igor Morozov, Odessa (UA)

(72) Inventor: Igor Morozov, Odessa (UA)

(*) Notice: Subject to any disclaimer, the term of this patent is extended or adjusted under 35 U.S.C. 154(b) by 162 days.

(21) Appl. No.: 17/888,871

(22) Filed: Aug. 16, 2022

(65) Prior Publication Data
US 2024/0059413 A1   Feb. 22, 2024

(51) Int. Cl.
*B64C 99/00* (2023.01)

(52) U.S. Cl.
CPC .................... *B64C 99/00* (2022.08)

(58) Field of Classification Search
CPC .......... F15B 21/12; B64C 99/00; B64D 27/00
See application file for complete search history.

(56) References Cited

U.S. PATENT DOCUMENTS

| | | | |
|---|---|---|---|
| 1,602,778 A | 10/1926 | Pitts | |
| 2,507,205 A * | 5/1950 | Griffin | B63H 1/32 440/20 |
| 2,751,876 A * | 6/1956 | Ogilvie | B63H 1/32 440/25 |
| 3,757,729 A * | 9/1973 | Golden | B63H 16/04 440/19 |
| 6,500,033 B1 | 12/2002 | Sagov | |
| 7,088,012 B2 * | 8/2006 | Gizara | F03B 17/065 290/43 |
| 9,638,177 B2 * | 5/2017 | Choi | F03G 7/10 |
| 10,060,409 B2 * | 8/2018 | Kassianoff | B60F 3/0007 |
| 10,273,932 B2 * | 4/2019 | Kassianoff | B63H 1/30 |
| 2003/0041597 A1 | 3/2003 | Haas | |
| 2012/0079915 A1 | 4/2012 | Choi | |
| 2016/0083060 A1 | 3/2016 | Kassianoff | |
| 2016/0068263 A1 | 4/2016 | Ristroph et al. | |
| 2017/0370344 A1 * | 12/2017 | Kassianoff | F03B 17/06 |

FOREIGN PATENT DOCUMENTS

WO            95/16606            6/1995

* cited by examiner

*Primary Examiner* — Philip J Bonzell
(74) *Attorney, Agent, or Firm* — Boris Leschinsky (57) ABSTRACT

A novel gas propulsion device comprises one or more high-frequency linear actuators (such as a voice coil linear actuator or a piezoelectric linear actuator) attached to one or more gas propulsion elements having a concave internal surface facing a first side thereof. Linear actuators operate to cause reciprocal movements of each gas propulsion element at a sufficient speed, such as a subsonic or supersonic speed, and suitable amplitude to form a high gas pressure zone on the first side of the gas propulsion element and a low gas pressure zone on the second side thereof. The gas pressure differential in turn causes propulsion of gas away from the device along the longitudinal axis or to the side of it if the gas propulsion element is tilted. The invention may be used as a main or secondary thrust engine for an aircraft.

20 Claims, 12 Drawing Sheets

GAS PROPULSION THRUST DEVICE

CROSS-REFERENCE DATA

This US Patent Application is a continuation-in-part of my Ukrainian Patent Application No. a202106466 filed 16 Nov. 2021, entitled "DEVICE FOR CONVERTING RECIPROCAL MOVEMENTS INTO PROPULSION MOVEMENT OF GAS". This application is incorporated herein by reference in its entirety.

BACKGROUND

Without limiting the scope of the invention, its background is described in connection with gas propulsion devices. More particularly, the invention describes a device configured to convert a reciprocal motion of an actuator into gas propulsion oriented in the desired direction. The device of the invention may be used as a main or a secondary thrust engine for a flight apparatus, for example, an airplane, an air taxi, a rocket, a helicopter, a hovercraft, a powered parachute, an air balloon, as well as other manned and unmanned aircraft devices.

A rotating propeller is the main thrust device used in many aircraft devices flying with speeds not exceeding the speed of sound. These devices include drones, quadcopters, automated air taxis, and other devices configured for take-off and landing in highly populated areas such as cities. Close encounter with people nearby creates a risk of injury to people from the rotation of one or more propellers of such a flying device. A recent trend for automated package delivery by a drone, for example, creates such a risk to a customer from the drone which is controlled by a remote controller with a just video camera, at best, to assure safety.

The need exists therefore for a simpler and safer engine device that can be configured to provide both the vertical lifting power as well as the horizontal thrust for an aircraft used in highly populated areas.

Prior art devices are known to attempt to accomplish this objective. One example is disclosed in the US Patent Application No. 20160068263, entitled "Flapping wing device", describing the main body and several wings hingedly coupled to the main body. The wings may be configured to reciprocate or "flap" relative to the main body to provide lift for the flapping wing device. A motor and transmission, such as a crankshaft, are used to drive the reciprocating motion of the wings. The wings reciprocate from a first position that is substantially vertically parallel to the main body of the device to a second position in which a second end, opposite the hinged end, extends away from the main body. The motion of the reciprocating wings may be reminiscent of the motion of a jellyfish.

This device has the following drawbacks:
This device imitates the motion of a wing. Starting at the ground, such motion may still cause injury to a person nearby, and therefore does not improve the safety profile of the aircraft;
This device uses a large number of mechanical transmission elements, such as joints, crankshaft, etc, thereby reducing the overall efficacy of transforming the energy of the rotating shaft to the thrust energy moving the aircraft.

Another aircraft thrust device is disclosed in the U.S. Pat. No. 1,602,778 entitled "Propeller for flying machines", describing an umbrella-type screw equipped with blades and configured for both rotation about the central axis as well as reciprocal motion along the central axis at the same time. The blades are configured for folding inward the main screw making its entire surface available for a lifting of the aircraft.

This gas propulsion device still suffers from a number of critical limitations, including:
The need to use both the rotation as well as reciprocal motion at the same time is inherently less effective as compared to just the rotation motion of the modern propellers,
Folding blades will inevitably create a high level of noise, which is detrimental when the apparatus is present near people, and
The aircraft using this engine would be subject to a constant rotational force directed in the opposite direction as compared with the direction of rotation of the screw itself, similar to the problem of modern helicopters—thereby necessitating yet another screw for the counterbalance.

Overall, this device is complex, noisy, and cannot create the thrust necessary for a flight of an aircraft, as evidenced by contemporary movies of the early days of aviation.

The need exists therefore for a more efficient and safe gas propulsion apparatus capable of creating sufficient lift and thrust for an aircraft using same.

SUMMARY

Accordingly, it is an object of the present invention to overcome these and other drawbacks of the prior art by providing a novel gas propulsion device configured for direct conversion of the reciprocal motion of the actuator to the propulsion of gas in the desired direction.

It is another object of the present invention to provide a novel gas propulsion device that is both safe to be around for people standing nearby as well as operates without excessive noise.

It is a further object of the present invention to provide a gas propulsion device with improved efficacy of energy use for causing gas propulsion as compared with other similar devices of the prior art.

It is yet a further object of the present invention to provide a gas propulsion device that can be adjusted to change the direction of gas propulsion thereby allowing to control the direction of flight of an aircraft using same.

The gas propulsion thrust device of the invention at least a first high-frequency linear actuator and at least a first gas propulsion element having a concave internal surface facing a first side thereof. The concave internal surface may be axisymmetric about a longitudinal axis. The first gas propulsion element may have a second convex external surface adjacent to the concave internal surface and facing the second side, opposite the first side thereof. The first linear actuator may be operatively attached to the first gas propulsion element and configured to cause reciprocal movements thereof. The speed and amplitude of these reciprocal movements may be selected to be at or exceeding the corresponding speed threshold and amplitude threshold so as to be sufficient to cause a formation of a high gas pressure zone on the first side of the gas propulsion element and a low gas pressure zone on the second side thereof. In embodiments, the reciprocal movement may occur at subsonic, supersonic, or even hypersonic speeds. The gas pressure differential in turn may cause propulsion of gas away from the first gas propulsion element along the longitudinal axis in a direction towards the first side thereof.

In further embodiments, the gas propulsion thrust device may have additional gas propulsion elements in various configurations as well as additional linear actuators arranged to cause reciprocal movement of the first and/or additional gas propulsion elements. Two useful types of linear actuators suitable for the purposes of the present invention include voice coil actuators as well as piezoelectric linear actuators.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF PREFERRED EMBODIMENTS OF THE INVENTION

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Figure 1:
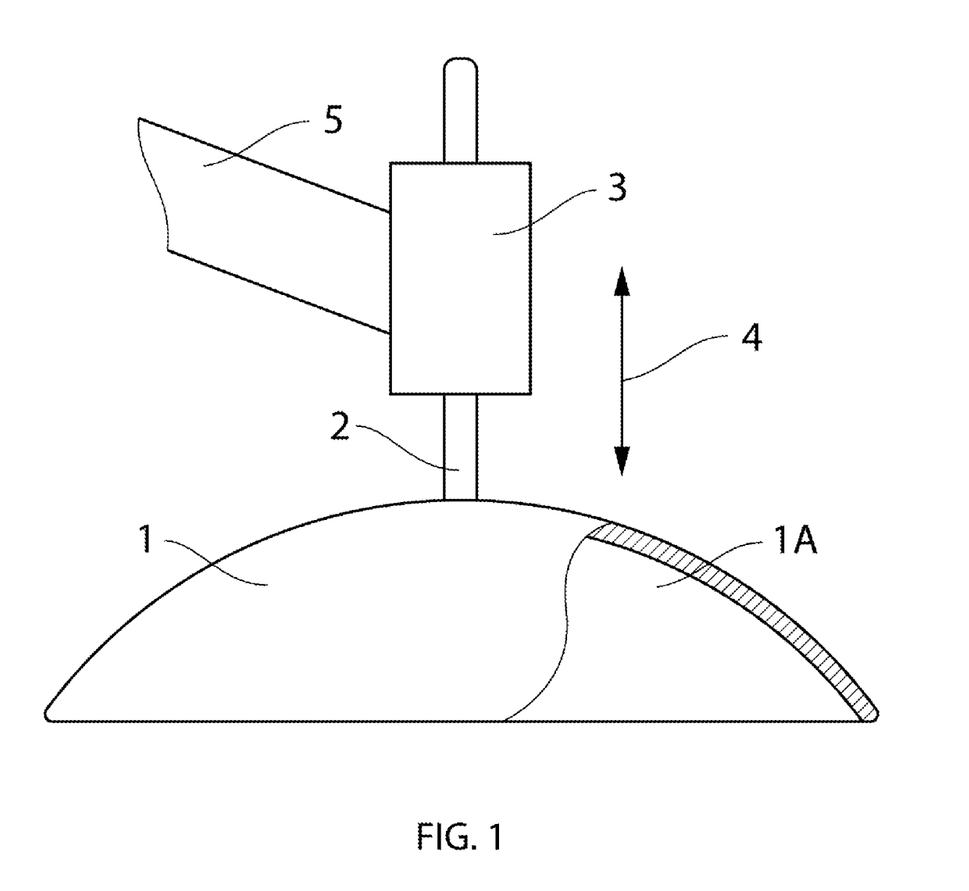
FIG. 1 is a schematic side view of the first embodiment of the invention.
Figure 2:
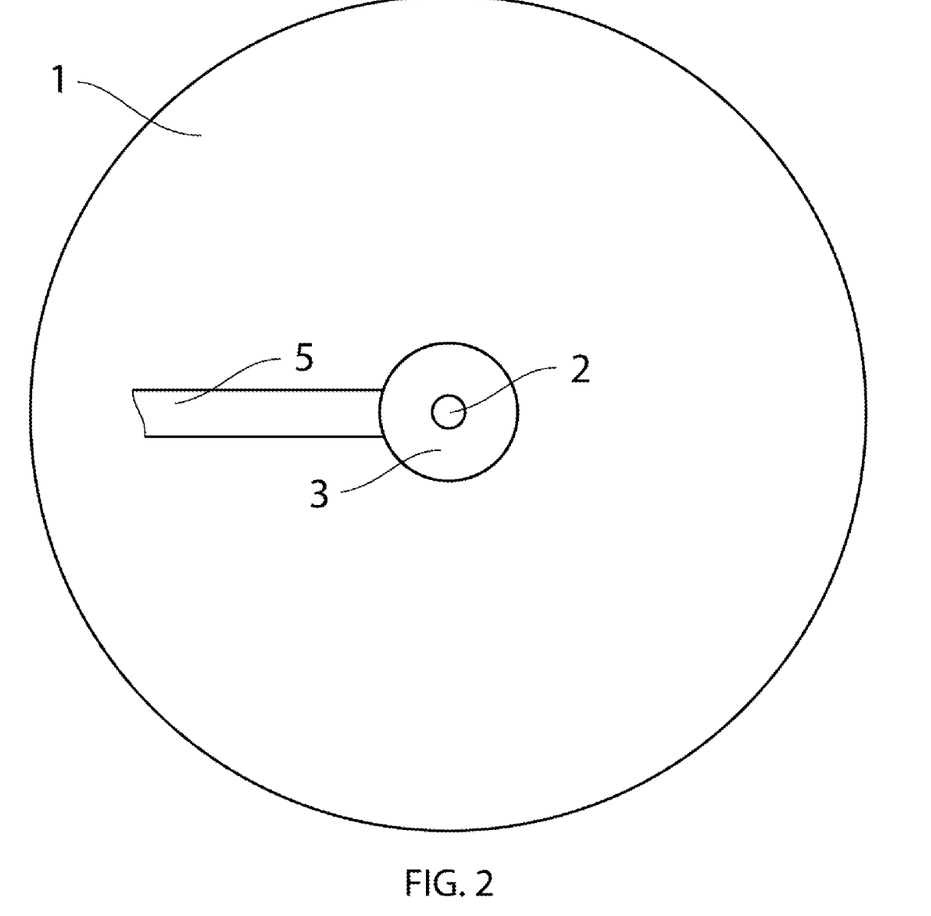
FIG. 2 is a top view of the same.

FIG. 1 shows a general side view and FIG. 2 shows a top view of the first embodiment of the invention. The first linear actuator 3 is seen attached at the top of the first gas propulsion element 1, for example via shaft 2. The first linear actuator 3 may be fixedly attached to the main body of an aircraft, for example via a side arm 5, although other arrangements are certainly possible as can be appreciated by those skilled in the art, so the design of the side arm is not limiting to the scope of the invention.

The first high-frequency linear actuator 3 may be configured to rapidly move the gas propulsion element 1 in a linear reciprocal manner. High frequency and speed of movement may be needed in order to achieve the objectives of the present invention. Two types of high-frequency linear actuators may be suitable for the present invention: voice coil actuators and piezoelectric linear actuators. Both of these actuators are capable of efficiently transforming electrical energy into rapid reciprocal movement without much of an inertial delay.

A voice coil linear actuator, also known as a non-commutated DC linear actuator, is a type of direct drive high-frequency linear motor. The name "voice coil" comes from one of its historically first applications: vibrating the paper cone of a loudspeaker. They are currently used for a wide range of applications, including moving much larger masses. Such actuator may consist of a permanent magnetic field assembly (permanent magnets and ferrous steel) and a coil assembly (not shown in the drawings). The electrical current flowing through the coil assembly interacts with the permanent magnetic field and generates a force vector perpendicular to the direction of the current. The force vector can be reversed by changing the polarity of the current flowing through the coil.

A voice coil linear actuator may be capable of a displacement of up to 5 in. Voice coils come in a range of sizes, from devices that generate a few ounces of force, to others that generate several hundred pounds of force. The actual design of the coil therefore may depend on the specific application of the present invention. In addition, voice coil actuators are advantageous in that they can move bi-directionally, have a constant force over the stroke, and can be used for either open-loop applications or closed-loop position or force applications.

A voice coil actuator generates a force based on an interaction of current carrying conductors in a permanent magnetic field. The force generated by the voice coil is proportional to the cross-product of the current flowing through the coil and the magnetic flux in the permanent magnetic field. The force generated is relatively constant throughout the stroke of the actuator, with minor decreases in force at the beginning and end of the stroke.

Either the coil assembly or permanent magnetic field assembly can be used as the moving member in a voice coil actuator. One suitable type of the high-frequency linear actuator of this type is referred to as a moving coil-type actuator. This actuator typically involves a coil wound around a bobbin—which can be made from many non-magnetic materials—which moves in and out of a permanent magnetic field assembly consisting of a steel housing with a concentric permanent magnet assembly in the middle.

Another suitable type of high-frequency actuator would be the moving magnet design, where the coil is fixed and the magnet assembly moves in and out. This design type may be advantageous in that it would prevent moving leads during operation. The package operates similarly, but instead of an exposed coil that moves in and out of the magnet assembly, the moving magnet style utilizes a permanent magnetic field assembly "piston" moving inside a cylindrical coil tube. This design may utilize a permanent field assembly attached to the shaft 2, and end caps containing bearings.

Advantages of a voice coil actuator include simple design and construction, low hysteresis, small size for a given design footprint, high accelerations, and a lack of cogging or commutation.

Another high-frequency linear actuator type that may be successfully used for the purposes of the present invention is a piezoelectric (also referred to as ultrasonic) linear actuator. A piezoelectric linear actuator creates useful linear motion by exciting a piezo element to produce high-frequency oscillations. In linear piezoelectric motors, the piezo element is a piezoelectric plate. Applying voltage excites the plate at its resonance frequency and creates eigenmode oscillations—meaning all parts of the plate move sinusoidally at the same frequency. The active element may be shaped in a form of a plank, plate, disk or any other suitable shape and may be preloaded against a runner (also referred to as a "slider") via a coupling, or pusher. Oscillations in the plate cause it to expand and contract, moving the coupling along an inclined patch. The coupling, in turn, makes contact with the runner and causes it to move linearly.

Piezoelectric ultrasonic actuators are sometimes referred to as "standing wave piezo actuators," due to the type of wave generated when the piezoelectric material is excited. A standing wave is formed when an incident (original) wave and a reflected wave interfere in such a way that there are points along the medium that appear to be standing still. They can also be configured to reverse the motion of the runner. As with the voice coil actuators, these linear actuators are advantageous due to their rapid response time, low inertia, and simple design.

Piezoelectric actuator may be also modified to directly provide high-frequency reciprocal longitudinal elongation and contraction which may be coupled to the gas propulsion element 1. As described elsewhere in this specification, this has to be done with sufficient speed and amplitude.

Other high-frequency electrically driven actuators can also be used to drive the gas propulsion element as long as they can achieve desired gas pressure differential described below, as the invention is not limited in this regard.

The first gas propulsion element 1 may be made in a form of a concave disk with an internal concave surface and an external convex surface as seen in FIG. 1. The internal concave surface is facing a first side 1A, while the external convex surface is facing the second side, opposite the first side 1A.

Activation of the reciprocal movement 4 of disk 1 along its longitudinal axis of symmetry causes uneven pressure zones to form on the first side of the gas propulsion element 1 as compared to the second side. Once suitable speed and amplitude of movement are achieved, a high gas pressure zone is formed on the first side of the gas propulsion element 1, and a low gas pressure zone is formed on the second side thereof. Specific values of the minimum speed threshold and minimum amplitude threshold that need to be reached or exceeded by the linear actuator are design-dependent and may be determined on a case-by-case basis and as function of the size and curvature of the gas propulsion element 1. In general, subsonic speeds and higher may be required for efficient operation. In embodiments, the gas propulsion element 1 may be reciprocally moved at a subsonic or supersonic speed, or even a hypersonic speed, as the invention is not limited in this regard.

In embodiments, the linear actuator 3 may be located either above the gas propulsion element 1 (as seen in FIG. 1) or below thereof on the first side (not shown), which in some cases may provide for better aerodynamics. In further embodiments, the linear actuator 3 may be located both along the central axis of symmetry as well as one a side thereof, as the invention is not limited in this regard.

Figure 3:
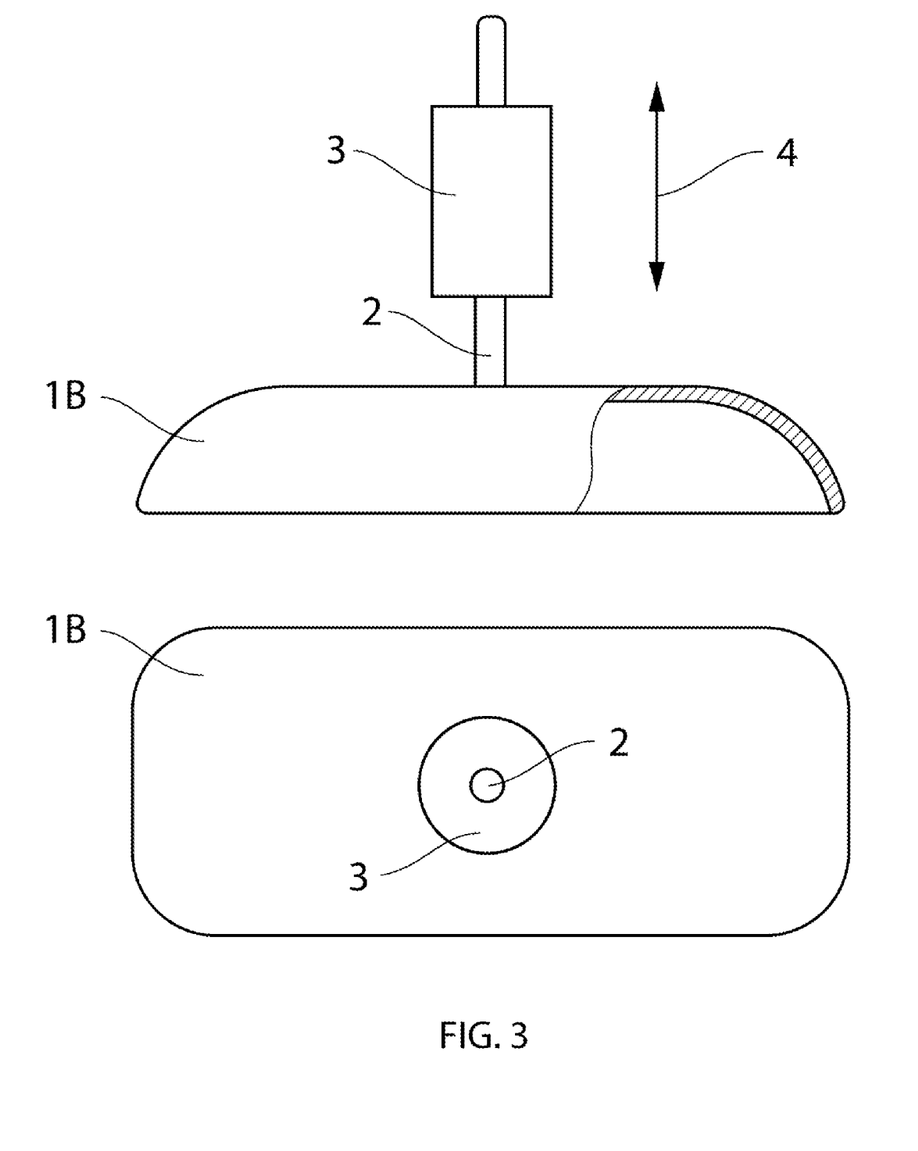
FIG. 3 is a schematic side view (top panel) and top view (bottom panel) of the second embodiment of the invention.

FIG. 3 shows a side view (top panel) and a top view (bottom panel) of the second embodiment of the invention in which the shape of the gas propulsion element is non-round but still symmetric about the axis of symmetry 2. A rounded rectangular form of the gas propulsion element 1B is shown here, but the invention is not limited in this regard. Other suitable shapes may be selected from the following: a circular shape, an oval shape, a triangular shape, a square shape, a rectangular shape, or another polygon shape, as the invention is not limited in this regard.

Figure 4:
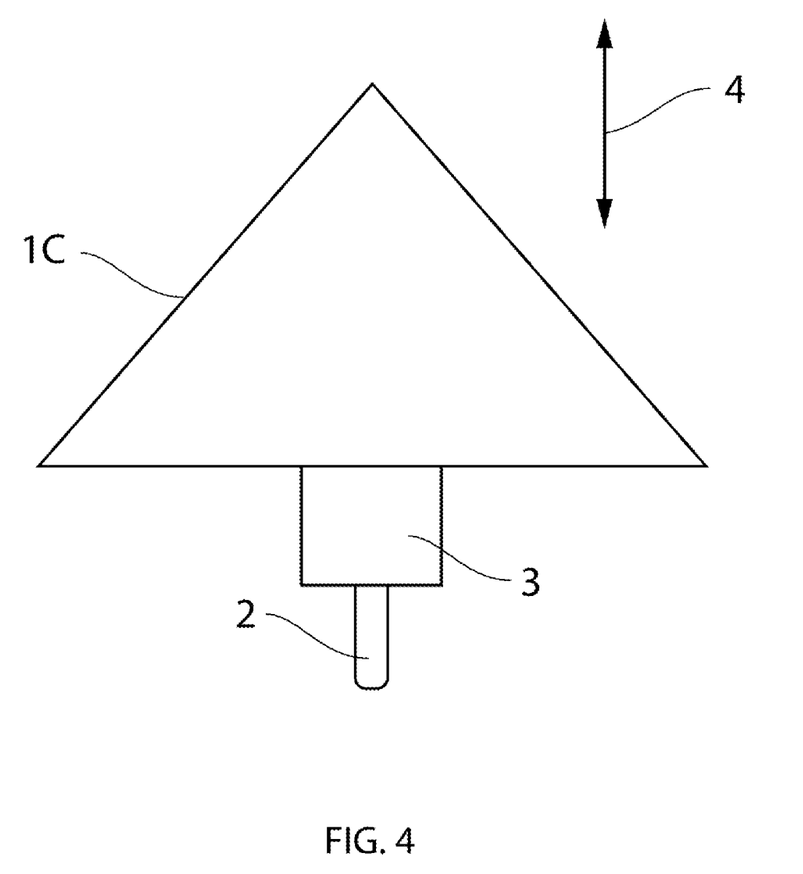
FIG. 4 is a side view of the third embodiment of the invention.

FIG. 4 shows other examples of a concave inner surface and convex external surface of the gas propulsion element 1, in this case, that of a cone for a third embodiment of the invention. This shape is presented as one example of a suitable cone shape. Specific proportions and the angle of the cone shape may vary based on specific operating conditions of the device as can be appreciated by those skilled in the art, as the invention is not limited in this regard.

Figure 5:
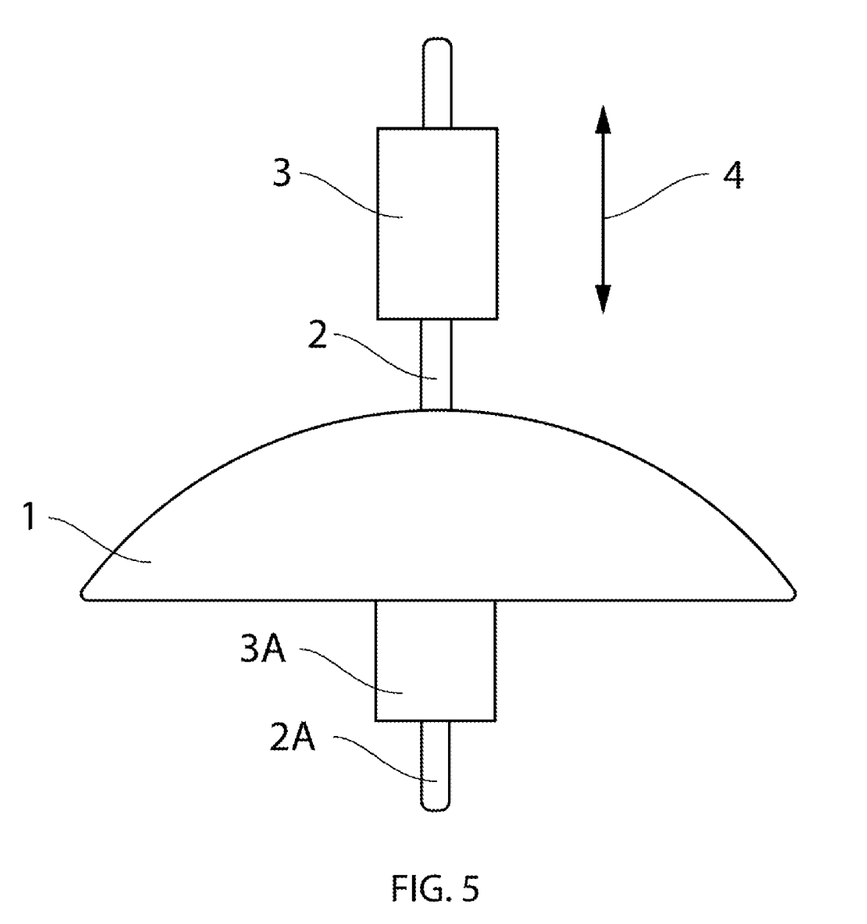
FIG. 5 is a side view of the fourth embodiment of the invention.

Further thrust improvement may be achieved by using more than one linear actuator to drive a single gas propulsion element 1. For example, FIG. 5 shows a side view of the fourth embodiment of the invention in which two linear actuators (first actuator 3 and second actuator 3A) with corresponding shafts 2 and 2A are used to drive the first gas propulsion element 1. Both linear actuators may be operated in a parallel and synchronous manner so as to drive the gas propulsion element in the same direction, with the same speed, and at the same amplitude. In this case, one linear actuator 3 may be located on one side of the gas propulsion element, while the other actuator 3A may be located on the other side thereof. In further embodiments, three or more linear actuators may be located on either side of the gas propulsion element 1.

Figure 6:
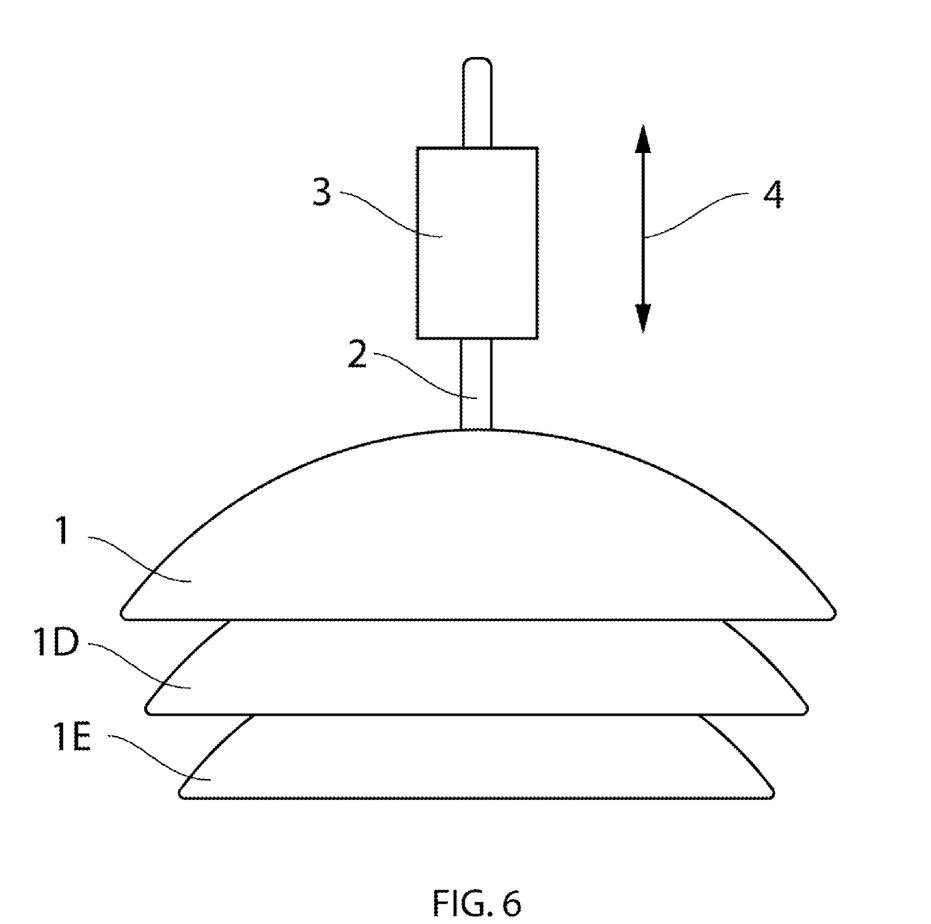
FIG. 6 is a side view of the fifth embodiment of the invention.

Additional thrust may also be achieved by using more than one gas propulsion elements—FIG. 6 shows one example of a fifth embodiment of the invention with three gas propulsion elements: the first gas propulsion element 1, the second gas propulsion element 1D, and the third gas propulsion element 1E, together forming a plurality of gas propulsion elements located in a stack form one on top of the other. More than three elements may be used as the invention is not limited in this regard. Suitable spacing is required to be maintained between adjacent gas propulsion elements so as to avoid interference between thereof. Such spacing may be calculated on a case-by-case basis for various applications of the invention. In addition to a stack form of positioning for the gas propulsion elements, they can be placed adjacent or side-by-side to one another, or in a mixed arrangement comprising some gas propulsion elements in a stack form, with stacks of such elements located side-by-side (not shown in the drawings).

Figure 7:
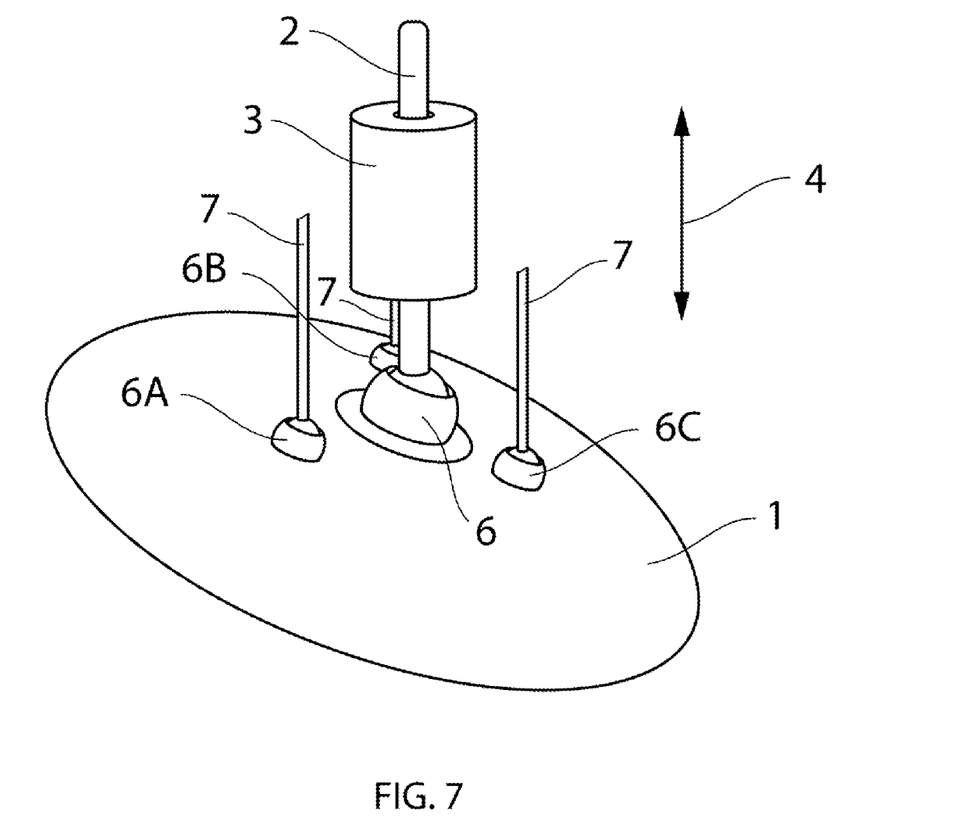
FIG. 7 is a perspective view of the sixth embodiment of the invention.

Direction adjustment may be accomplished by tilting the first gas propulsion element 1 in one or more directions. One example of such a design is seen in FIG. 7 as the sixth embodiment of the invention. The linear actuator 3 is attached to the external convex surface of the first gas propulsion element 1 via a central joint 6, such as a ball joint or a cylinder joint. One or more additional ball joints 6A, 6B, and 6C may also be provided for attachment of one or more control arms 7 configured to tilt the angle of the gas propulsion element 1 in any desired direction along its entire periphery. Once the gas propulsion element 1 is tilted, the gas propulsion direction is changed in accordance with its new position away from the longitudinal axis of the device.

Figure 8:
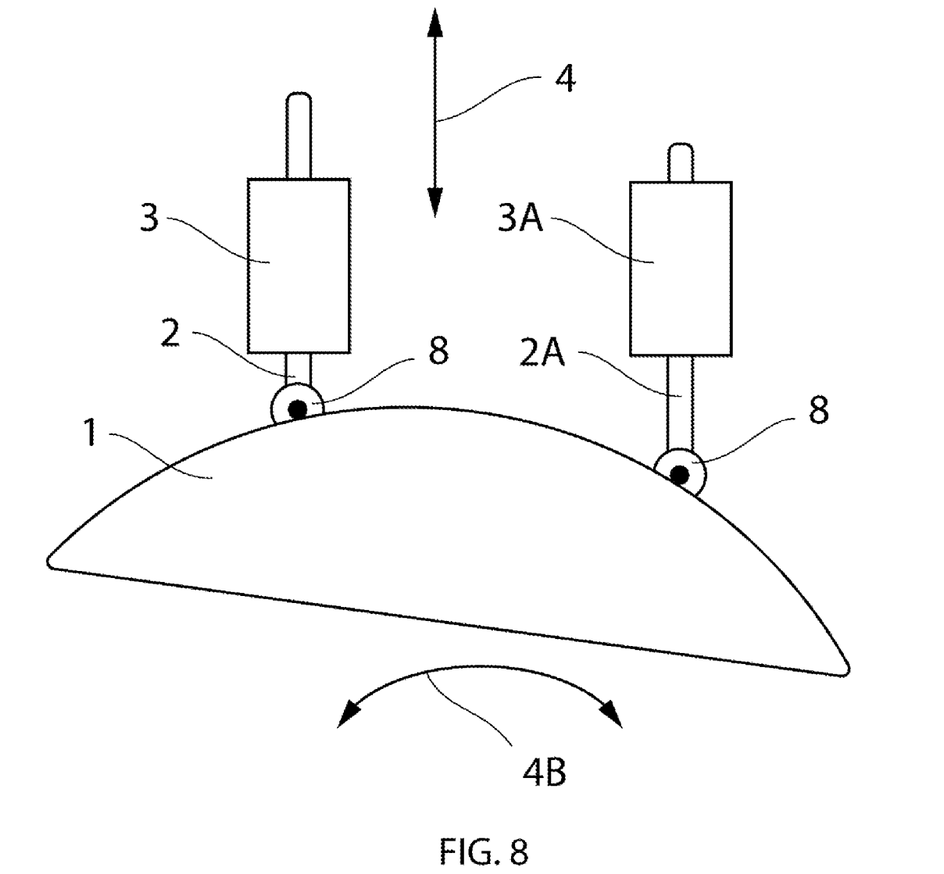
FIG. 8 is a side view of the seventh embodiment of the invention.

FIG. 8 shows a seventh embodiment of the invention in which two linear actuators 3 and 3A are located in parallel to each other and are attached to the first gas propulsion element 1 via ball or cylinder joints 8. Moving one linear actuator up or down along the longitudinal axis as compared to the other one allows an alternative way of changing the orientation of the first gas propulsion element 1 and therefore changing the direction of the gas propulsion 4B emanated therefrom.

Figure 9:
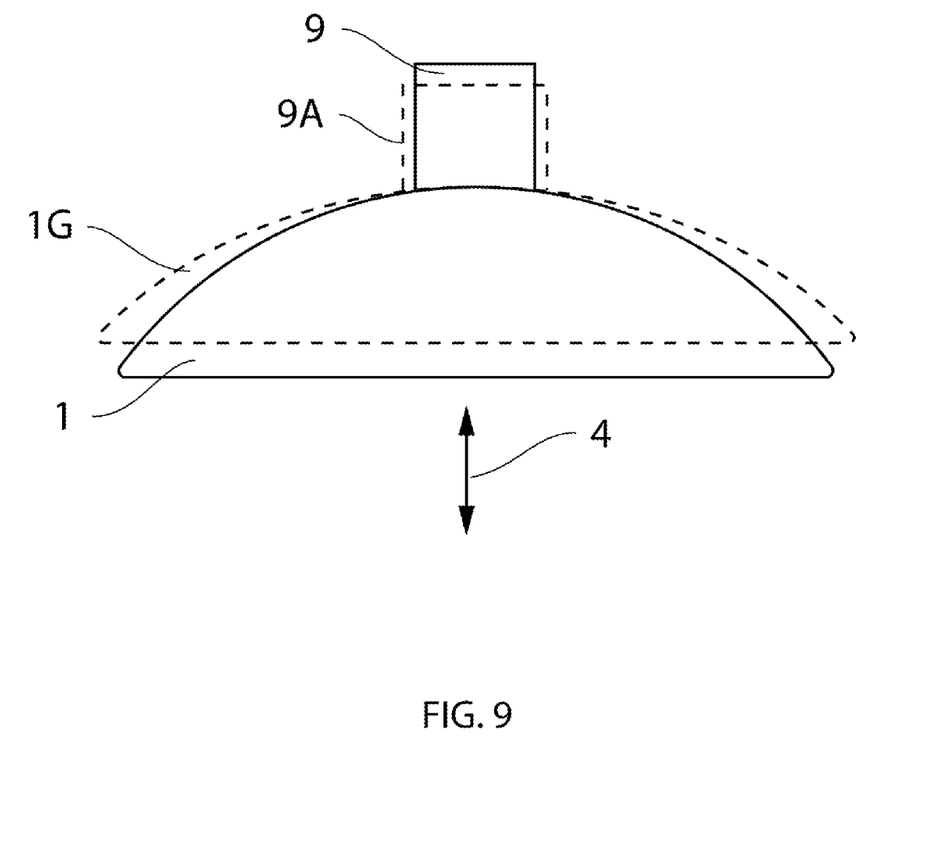
FIG. 9 is a side view of the eighth embodiment of the invention.

FIG. 9 shows a side view of the eighth embodiment of the invention. The gas propulsion element 1 may be made from a material that is configured to change its shape from shape 1 to shape 1G as a result of applying electricity directly to element 1. In one example, such reciprocal movements may be caused by making the element 1 from a piezoelectric material, configured to perform indicated shape changes. In further embodiments, the gas propulsion element 1 may be made together with the linear actuator 1 as a single body so that either one of them or they both may be caused to change their respective shapes (1 to 1G and 9 to 9A respectively) upon activation of the linear actuator 9.

Figure 10:
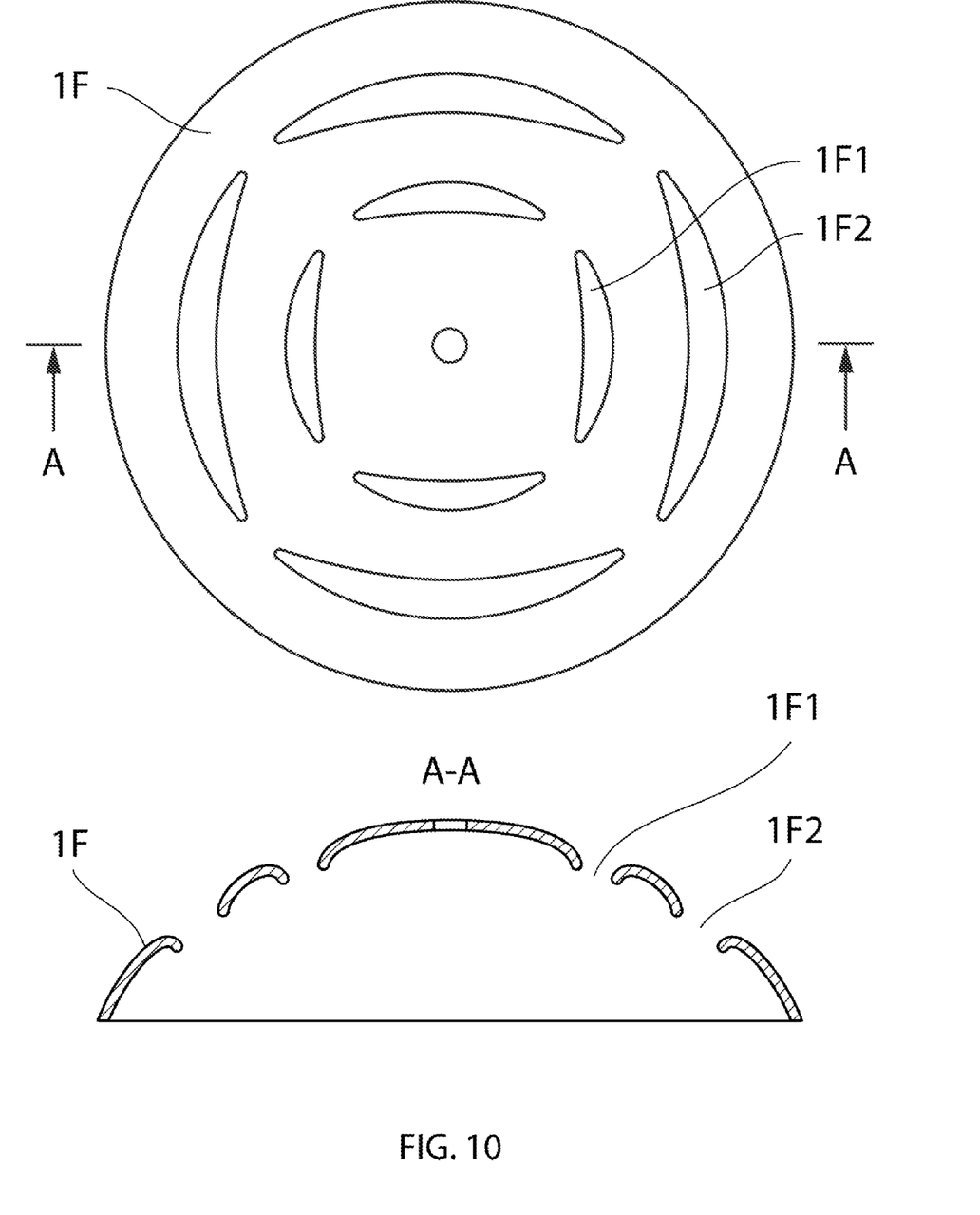
FIG. 10 is a side view (bottom panel) and top view (top panel) of the ninth embodiment of the present invention.

FIG. 10 shows yet another, the ninth embodiment of the invention. To further enhance control of the gas flow, various local surface features such as openings 1F1 and 1F2 may be made along the surface of the gas propulsion element 1 (see top panel). In addition, these openings may have curved internal edges (see bottom panel) configured to further enhance the creation of the pressure differential upon activation of the linear actuator (not shown). Other useful local surface features may include local grooves, holes, indents, etc.

Figure 11:
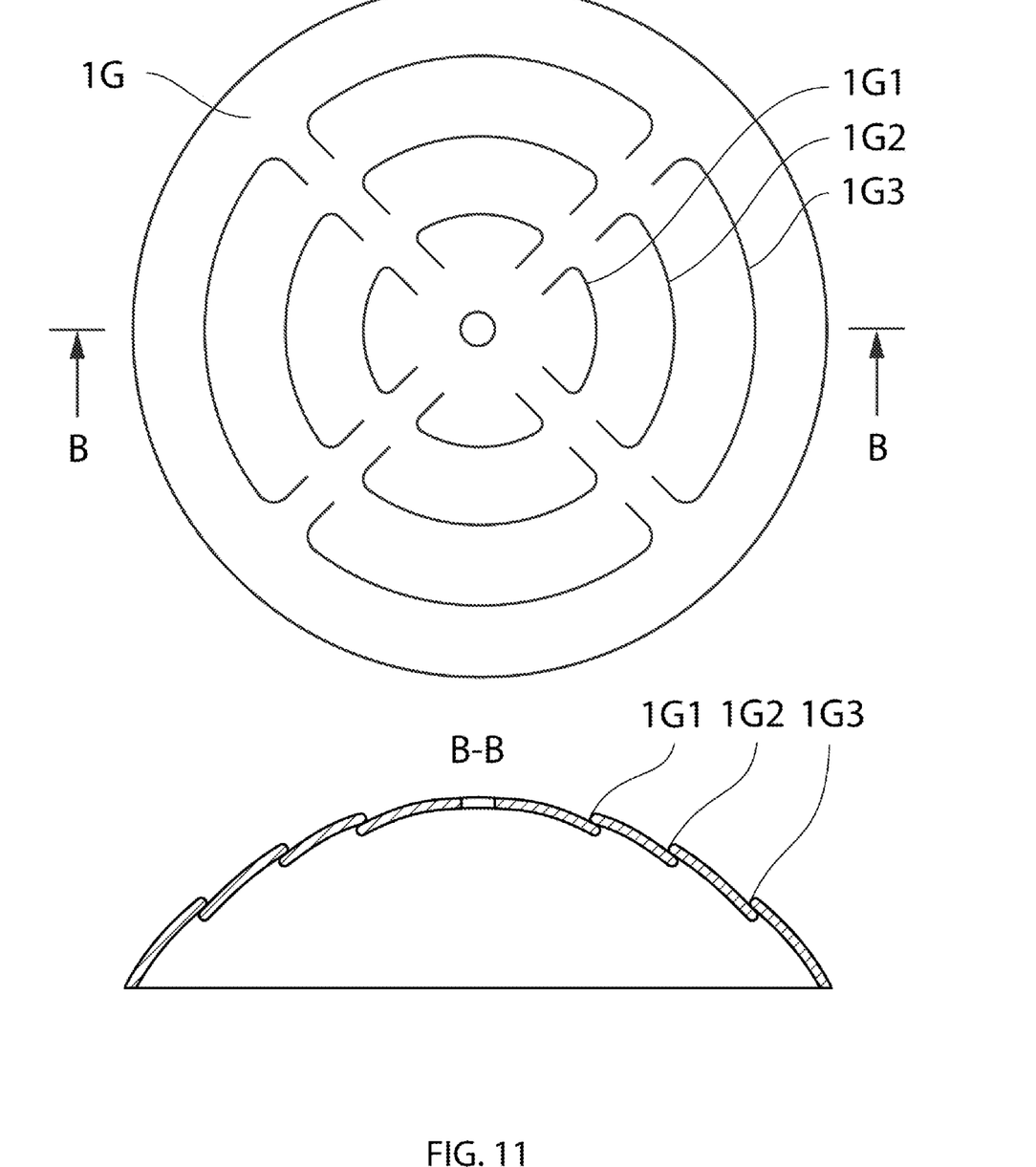
FIG. 11 is a side view (bottom panel) and top view (top panel) of the tenth embodiment of the present invention.
Figure 12:
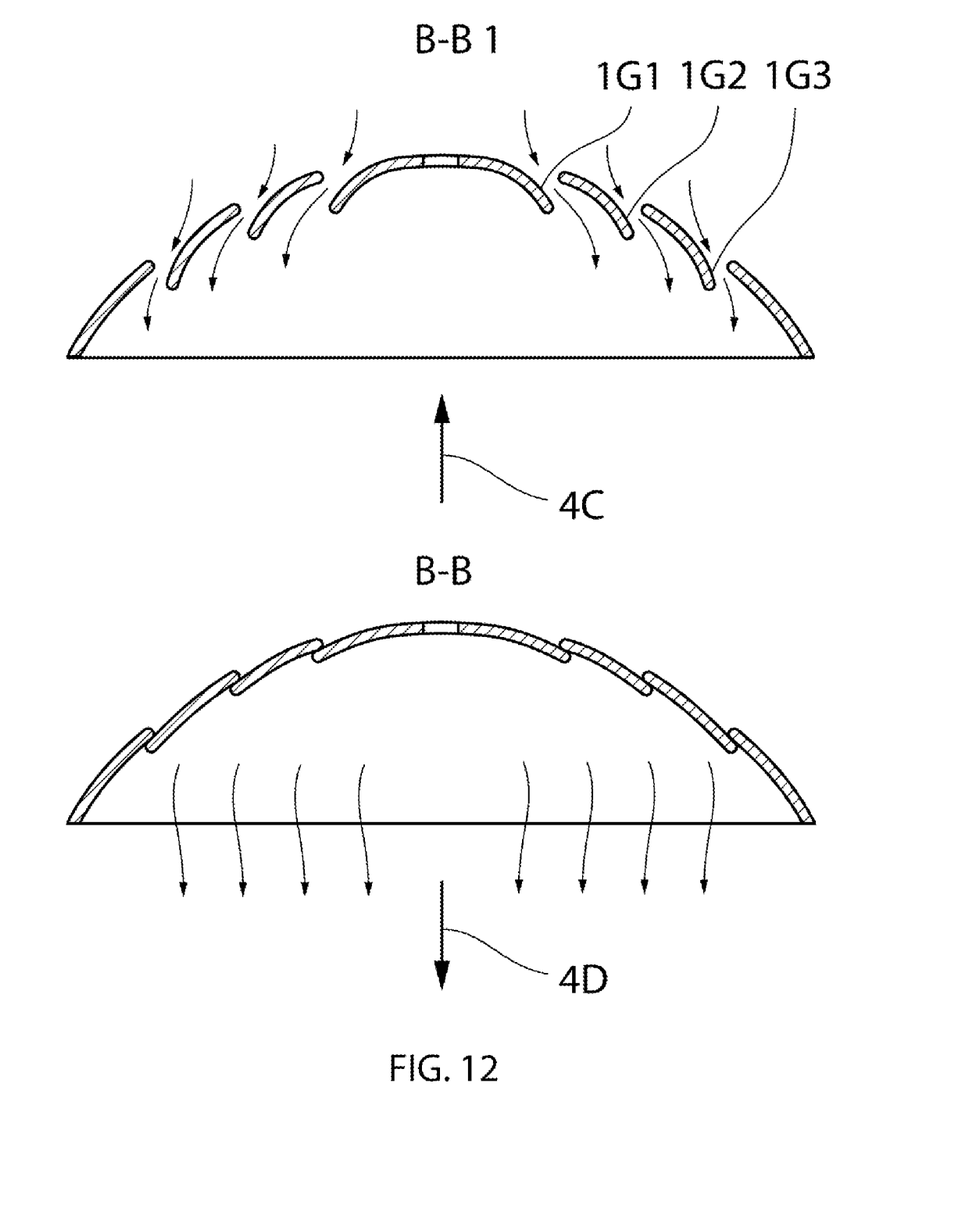
FIG. 12 is a side view moving down (bottom panel) and a side view moving up (top panel) of the same in operation.

Finally, FIGS. 11 and 12 show a tenth embodiment of the invention in which the gas propulsion element has a plurality of overlapping peripheral fins 1G1, 1G2, 1G3, etc. with each more central fin overlapping the adjacent fin extended further to the periphery of the gas propulsion element 1. Initially, all gaps between the fins are closed, as seen on the cross-section B-B shown on the bottom panel of FIG. 11. As the gas propulsion element is moved in a direction of the second side of the gas propulsion element (FIG. 12, top panel, arrow 4C), the edges of the fins may bend to open passages inbetween so that the gas has additional pathways to go across the surface of the gas propulsion element—as shown by multiple arrows in the drawing. When the movement is reversed and directed to the first side to generate thrust, as seen in the bottom panel of FIG. 12, arrow 4D, the passages between the fins are closed and the entire gas propulsion element acts as a single unit, therefore maximizing generated thrust. In summary, each cycle of reciprocal movement of the gas propulsion element is accompanied by bending of the fin edges so as to open and then close gas passages across the surface thereof. This may be accomplished by using flexible steel as material for the gas propulsion element. The thickness of the steel may be selected to achieve desired spring performance of the fin edges within elastic limits of the material as discussed above. Other than steel materials may also be used, provided that they can performs in a manner described herein.

Although the above-described embodiments are discussed as operating in a gas environment, the same concept may be used for creating thrust in a liquid environment, such as an engine for moving various surface floating watercrafts as well as underwater crafts as can be appreciated d by those skilled in the art. In addition, one or more devices of the present invention may be aggregated together and form a group of engines, which may be configured to provide thrust—alone or in combination with yet another type of a thrust engine for a flying or floating craft.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AftBBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A gas propulsion thrust device comprising:
   a first high-frequency linear actuator aligned along a direction of propulsion thrust, and
   a first gas propulsion element having a rigid concave internal surface facing a first side thereof, the concave internal surface is axisymmetric about a longitudinal axis aligned along the direction of propulsion thrust, the first gas propulsion element having a second convex external surface adjacent the concave internal surface and facing the second side, opposite the first side thereof, the first gas propulsion element is submerged in and surrounded by said gas,
   wherein the first high-frequency linear actuator is operatively attached to the first gas propulsion element and configured to cause reciprocal movements thereof along the direction of propulsion thrust with a speed at or exceeding a predetermined transonic speed threshold and an amplitude at or exceeding a predetermined amplitude threshold being sufficient to cause a formation of a high gas pressure zone on the first side thereof and a low gas pressure zone on the second side thereof as a result of reciprocal movement thereof, wherein the speed of movement is the same in both directions of the reciprocal movements, thereby generating a gas pressure differential across the gas propulsion element and along the direction of propulsion thrust causing propulsion of gas away from the first gas propulsion element and in a direction opposite the direction of propulsion thrust.

2. The gas propulsion device as in claim 1, wherein the high-frequency linear actuator is a piezoelectric linear actuator.

3. The gas propulsion device as in claim 1, wherein the first high-frequency linear actuator is located along the longitudinal axis of the device on either the first side or the second side of the first gas propulsion element.

4. The gas propulsion device as in claim 1, wherein the first gas propulsion element is shaped in a form of a convex disk, a cone, an oval, a triangle, a square, a rectangle, or another polygon shape.

5. The gas propulsion device as in claim 1, wherein the first high-frequency linear actuator and the first gas propulsion element are made together as a single body, configured to change its shape upon applying electricity thereto.

6. The gas propulsion device as in claim 1, wherein the first high-frequency linear actuator is configured to cause reciprocal movements thereof along the direction of propulsion thrust with a speed at or exceeding a predetermined supersonic speed threshold.

7. The gas propulsion thrust device, as in claim 1, wherein the first gas propulsion element is configured to maintain a profile of the concave internal surface to be the same in both directions of reciprocal movements thereof.

8. The gas propulsion device, as in claim 1, wherein the first gas propulsion element is submerged in and surrounded by said gas without adjacent mechanical restrictions affecting said gas when moving between the internal surface and the external surface thereof.

9. The gas propulsion device as in claim 1, wherein the high-frequency linear actuator is a linear voice coil actuator.

10. The gas propulsion device as in claim 9, wherein the linear voice coil actuator comprises a moving member being either a coil assembly or a permanent magnetic field assembly.

11. The gas propulsion device as in claim 1, further comprising a second high-frequency linear actuator operatively attached to the first gas propulsion element, wherein both the first and the second high-frequency linear actuators and configured to cause direct reciprocal movements of the first gas propulsion element.

12. The gas propulsion device as in claim 11, wherein both the first and the second high-frequency linear actuators are operated in a parallel and synchronous manner.

13. The gas propulsion device as in claim 11 wherein two or more high-frequency linear actuators are positioned in parallel to each other.

14. The gas propulsion device as in claim 13, wherein the two or more high-frequency linear actuators are configured for moving one or more linear actuators causing the first gas propulsion element to tilt, therefore changing gas propulsion direction away from the longitudinal axis thereof.

15. The gas propulsion device as in claim 1, further comprising a second or more gas propulsion elements forming a plurality of gas propulsion elements.

16. The gas propulsion device as in claim 15, wherein the plurality of gas propulsion elements are positioned in a stack form along the longitudinal axis of the gas propulsion device.

17. The gas propulsion device as in claim 1, wherein the first high-frequency linear actuator is operatively attached to the first gas propulsion element via a ball joint configured to allow the first gas propulsion element to be tilted away from the longitudinal axis so as to change gas propulsion direction of the gas propulsion device.

18. The gas propulsion device as in claim 17 further comprising one or more control arms operatively attached to the first gas propulsion element via respective ball joints and configured to cause tilting thereof.

19. The gas propulsion device as in claim 1, wherein the first gas propulsion element comprises one or more local surface features to enhance gas propulsion.

20. The gas propulsion device as in claim 19, wherein the one or more local features are overlapping fins configured to open gas passages across a surface of the gas propulsion element when moved in a direction of a second side thereof and close the gas passages when moved in a direction toward the first side thereof.

* * * * *